(12) United States Patent
Trünkle et al.

(10) Patent No.: US 12,187,286 B2
(45) Date of Patent: Jan. 7, 2025

(54) SYSTEM AND METHOD FOR DISABLING A RETARDER DURING A GEARSHIFT AT LOW SPEEDS FOR IMPROVED DRIVER COMFORT

(71) Applicant: Bendix Commercial Vehicle Systems LLC, Avon, OH (US)

(72) Inventors: Bernhard Trünkle, Ludwigsburg (DE); Thomas S. Miller, Jr., Lagrange, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 0 days.

(21) Appl. No.: 18/135,483

(22) Filed: Apr. 17, 2023

(65) Prior Publication Data
US 2024/0343253 A1    Oct. 17, 2024

(51) Int. Cl.
| | | |
|---|---|---|
| *B60W 30/19* | (2012.01) | |
| *B60T 8/32* | (2006.01) | |
| *B60W 10/11* | (2012.01) | |
| *B60W 10/196* | (2012.01) | |
| *B60W 10/198* | (2012.01) | |
| *F16H 59/44* | (2006.01) | |

(Continued)

(52) U.S. Cl.
CPC .......... *B60W 30/19* (2013.01); *B60T 8/3215* (2013.01); *B60W 10/11* (2013.01); *B60W 10/196* (2013.01); *B60W 10/198* (2013.01); *F16H 59/44* (2013.01); *F16H 59/54* (2013.01); *F16H 61/04* (2013.01); *B60T 2250/04* (2013.01); *B60W 2510/18* (2013.01); *B60W 2520/10* (2013.01); *B60W 2710/10* (2013.01); *B60W 2710/18* (2013.01)

(58) Field of Classification Search
CPC .... B60W 30/19; B60W 10/11; B60W 10/196; B60W 10/198; B60W 2510/18; B60W 2520/10; B60W 2710/10; B60W 2710/18; F16H 59/44; F16H 59/54; F16H 61/04
USPC .......................................................... 701/70
See application file for complete search history.

(56) References Cited

U.S. PATENT DOCUMENTS

| | | | |
|---|---|---|---|
| 4,480,728 A | 11/1984 | Bailey et al. | |
| 11,834,015 B2 * | 12/2023 | Menne | .................... B60T 10/02 |

(Continued)

FOREIGN PATENT DOCUMENTS

| | | |
|---|---|---|
| DE | 24 05 740 A1 | 8/1975 |
| DE | 30 26 773 A1 | 2/1981 |

(Continued)

OTHER PUBLICATIONS

Andersky, F. and Conklin, R. et al.; "Road Map for the Future: Making the Case for Full-Stability"; White paper BW2719; Bendix Commercial Vehicle Systems LLC; 2008; 48 pages.

(Continued)

*Primary Examiner* — Colby M Hansen
(74) *Attorney, Agent, or Firm* — Crowell & Moring LLP

(57) ABSTRACT

A system and method are provided for disabling a retarder during a gearshift at low speeds for improved driver comfort. These embodiments recognize that power flow is interrupted during a shifting process and use that opportunity to disable the retarder at low speeds, thereby eliminating an additional, uncomfortable jolt to the driver. Several embodiments are provided.

20 Claims, 5 Drawing Sheets

(51) Int. Cl.
*F16H 59/54* (2006.01)
*F16H 61/04* (2006.01)

(56) References Cited

U.S. PATENT DOCUMENTS

| | | | | |
|---|---|---|---|---|
| 2008/0004784 | A1* | 1/2008 | Rushing | B60W 10/06 701/70 |
| 2008/0172162 | A1* | 7/2008 | Wegeng | B60T 10/02 701/70 |
| 2013/0047955 | A1* | 2/2013 | Reedy | B60W 10/06 123/320 |
| 2014/0257656 | A1* | 9/2014 | Schwartz | B60T 7/12 701/61 |
| 2020/0039486 | A1* | 2/2020 | Miller, Jr. | B60T 17/18 |
| 2021/0095754 | A1* | 4/2021 | Shultz | B60W 10/30 |
| 2022/0194330 | A1* | 6/2022 | Menne | B60T 10/02 |
| 2022/0356946 | A1* | 11/2022 | Debuyser | F16H 59/48 |
| 2024/0300460 | A1* | 9/2024 | Fan | B60T 8/17554 |

FOREIGN PATENT DOCUMENTS

| | | |
|---|---|---|
| DE | 31 34 259 A1 | 3/1983 |
| DE | 198 40 284 A1 | 8/1999 |
| DE | 100 53 084 C1 | 5/2002 |
| EP | 1 418 101 B1 | 4/2012 |

OTHER PUBLICATIONS

"Exhaust brake"; Wikipedia page; downloaded from the Internet on Apr. 17, 2023 at https://en.wikipedia.org/wiki/Exhaust_brake; Mar. 1, 2023; 3 pages.

Jacobs Vehicle Systems® Jacobs Engine Brake Model 465A, for the Cummins ISX12 Engine product brochure; P/N 00-041796 Rev. C, Feb. 2016; Jacobs Vehicle Systems, Inc.; Feb. 2016; 2 pages.

"How a Jake Brake Works—Jacobs Vehicle Systems"; YouTube video page; JacobsVehicleSystems; downloaded from the Internet on Apr. 17, 2023 at https://www.youtube.com/watch?v=HkfjCJC1WVA; 2016; 2 pages.

"Allison's Integral Retarder"; YouTube video page; Allison Transmission; downloaded from the Internet on Apr. 17, 2023 at *Allison's Integral Retarder—YouTube*; 2021; 3 pages.

"Telma Operating Principle—English"; YouTube video page; TelmaCSE; downloaded from the Internet on Apr. 17, 2023 at *Telma Operating Principle—English—YouTube*; 2015; 2 pages.

Extended European Search Report, Sep. 16, 2024, pp. 1-10, issued in European Application No. 24169698.8, European Patent Office, Munich, Germany.

\* cited by examiner

SYSTEM AND METHOD FOR DISABLING A RETARDER DURING A GEARSHIFT AT LOW SPEEDS FOR IMPROVED DRIVER COMFORT

BACKGROUND

Some vehicles are configured with both a retarder and service brakes to provide deceleration. For example, an engine retarder can decelerate a vehicle by compressing air within a piston cylinder of the engine and releasing the air to provide retardation torque. A retarder can be used to decelerate a vehicle during long downhill journeys to avoid unnecessary wear-and-tear and/or overheating of the service brakes.

SUMMARY

In one embodiment, a non-transitory computer-readable storage medium is provided that stores computer-readable instructions that, when executed by one or more processors in a vehicle comprising a retarder, cause the one or more processors to: determine whether a speed of the vehicle is below a first threshold but above a second threshold; and in response to determining that the speed of the vehicle is below the first threshold but above the second threshold, disable the retarder during a gear shift.

In another embodiment, a method is provided that is performed in a vehicle comprising an engine and an engine retarder configured to decelerate the vehicle. The method comprises: determining that the engine retarder is to be disabled; and delaying disabling the engine retarder until a gear shift occurs.

In yet another embodiment, a vehicle is provided comprises an engine, a transmission, an engine retarder; and means for disabling the engine retarder at a gearshift of the transmission in response to the vehicle decelerating to a speed between first and second threshold values.

Other embodiments are possible, and each of the embodiments can be used alone or together in combination.

DETAILED DESCRIPTION

Figure 1:
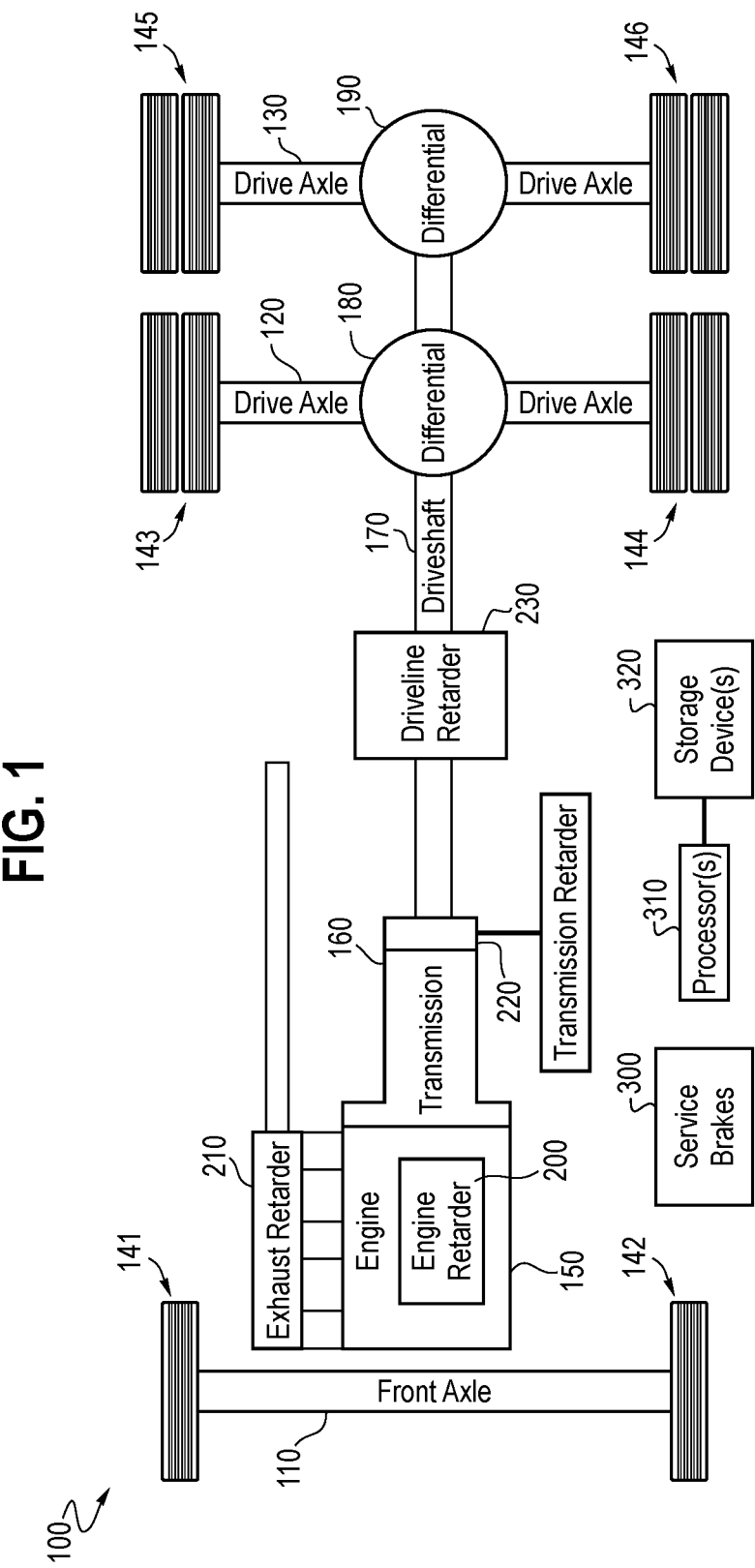
FIG. 1 is a diagram of a vehicle of an embodiment.

Turning now to the drawings, FIG. 1 is a diagram of a vehicle 100 of an embodiment. In this embodiment, the vehicle 100 takes the form of a commercial vehicle, such as a tractor configured to tow a trailer, with a 6×4 power unit. However, it should be understood that these embodiments can be used with any suitable type of vehicle. Further, while FIG. 1 shows some example components, it should be understood that different/fewer/additional components can be used.

As shown in FIG. 1, in this embodiment, the vehicle 100 comprises a front axle 110, two rear driven axles 120, 130, six sets of wheel ends 141-146, and an engine 150. The transmission 160 of the engine rotates a driveshaft 170, and differentials 180, 190 apply the rotation of the driveshaft 170 to rotate the two driven axle 120, 130.

The vehicle 100 also comprises an engine retarder 200, an exhaust retarder 210, a transmission retarder 220, and a driveline retarder 230, which can be used to decelerate the vehicle 100. In general, the engine retarder 200 decelerates the vehicle 100 by compressing air within a piston cylinder of the engine 150 and releasing the air to provide retardation torque. The exhaust retarder 210 decelerates the vehicle 100 by restricting the exhaust flow, which causes a pressure to build within the engine 150 to provide retardation torque. The transmission retarder 220 decelerates the vehicle 100 by using hydraulic fluid on the output side of the transmission 160 to provide retardation torque. The driveline retarder 230 decelerates the vehicle 100 by using electromagnetic fields to provide retardation torque. In one embodiment, a driver can manually operate one or more of the retarders 200, 210, 220, 230 (e.g., by using a lever on the steering wheel). Additionally or alternatively, a driver assistance system can activate one or more of the retarders 200, 210, 220, 230 (e.g., by sending a torque request directly to the retarder or by sending a deceleration request to a braking system, which then indirectly activates the retarder).

In addition to these retarders, the vehicle 100 comprises service (foundation/air/friction) brakes 300 that can decelerate the vehicle 100 by using air to apply friction to the wheel ends 141-146. Retarders and air brakes have various advantages over one other. For example, while air brakes are subject to wear, retarders are not. However, because the power transmission from the engine retarder 150 depends on the gear selected and is interrupted when the clutch opens, the deceleration caused by the engine retarder 150 can be associated with a longer reaction time and lower precision as compared to air brakes. Also, the maximum available retarder torque is generally dependent on engine speed, which is not a limitation of air brakes. However, retarders can reduce some of the work that compressed air brakes must do during long downhill journeys, which avoids unnecessary wear-and-tear and/or overheating of the service brakes.

The vehicle 100 also comprises one or more processors 310 and one or more storage devices 320. A storage device can be a non-transitory computer-readable storage medium and take any suitable form, such as, but not limited to, volatile or non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), and variants and combinations thereof. A storage device can be capable of storing computer-readable instructions (e.g., readable program code, modules, routines, sub-routines, etc.) that can be executed by the processor(s) 310 to perform the functions described herein and, optionally, other functions. The processor(s) 310 can also take the form of a purely-hardware implementation (e.g., an application-specific integrated circuit (ASIC)) that performs function(s) without executing a computer program stored in the storage device(s) 320.

Although not shown in FIG. 1 to simplify the drawings, the processor(s) 310 can be in wired or wireless communication (e.g., via a network, such as a Controller Area Network (CAN)) with various components of the vehicle 100 to control their operations. For example, the processor(s) 310 can be in communication with the engine, exhaust, transmission, and/or driveline retarders 200, 210, 220, 230 (or their controllers) to enable/disable and activate them. The processor(s) 310 can also be in communication with the service brakes 300 to active them. In this way, the processor(s) 310 can be used to provide automatic braking of the vehicle 100 (e.g., as part of an electronic braking or advanced driver assistance system (ADAS)) using the retarders 200, 210, 220, 230 and/or service brakes 300, as appropriate. The processor(s) 310 can be in communication with other components of the vehicle, which are not shown in FIG. 1 to simplify the drawing.

As noted above, powertrain retarders can be used in commercial vehicles to provide an additional way of decelerating the vehicle. Because a commercial vehicle often has ten times or more the mass of a passenger car, retarders provide the advantage of less heat generation compared to friction braking. An engine retarder is currently the most-common type of retarder in North America and utilizes the engine cooling system to dissipate the energy in the vehicle. This is beneficial for situations that require extended braking, such as descending a grade, so that the service/foundation brakes do not overheat.

An engine retarder provides braking torque at the crankshaft of the engine. It is not uncommon for an engine retarder to provide up to 1,250 Nm (~ 920 ft-lbs) or more of torque. Diesel engines also have a limited operating speed band within which they can safely operate. As a result, as the vehicle changes speed, the transmission changes gears to keep the engine within an acceptable speed range. With each gear shift, the gear ratio between the crankshaft of the engine and the wheel end changes. From a mechanical engineering perspective, this is known as a "power balance." If the power delivered by the retarder is constant, then, as the vehicle slows down, the torque at the wheel end increases:

$$\text{Power (Watts)} = \text{Torque } (N \cdot m) * \text{Speed}\left(\frac{\text{rad}}{\text{s}}\right)$$

Because the engine is to stay within a speed band, and the retarder torque is defined within this speed band, the power generated by the retarder is consistently within an operating range. As the transmission changes gears when the vehicle slows, the road torque will jump with each gear change. At higher speeds, this gear ratio between the crankshaft of the engine and the wheel end is small, meaning that for high retarder torque at the crankshaft, the torque at the wheel end is relatively low. This means the vehicle deceleration is low and torque changes at the driveshaft are barely noticeable to the driver. However, as the vehicle slows and the transmission shifts, the gear ratio begins to increase. This increases the torque at the wheel end, and the deceleration becomes more noticeable to the driver. As the vehicle continues to slow to a very-low speed, the road torque becomes very large, and changes in vehicle deceleration become noticeable to the driver.

To further take advantage of the additional road torque provided at lower gears, powertrains are often tuned to downshift to a lower gear when the retarder is activated. This will result in a high engine speed after each downshift. Because each gearshift will effectively remove braking, shifts are typically delayed as long as possible. The result is that when the transmission does shift, it will often "skip shift' multiple gears. Then, it will remain in that gear as long as possible to keep the retarder torque engaged at the wheel ends as long as possible.

Shifting focus from powertrain retarders to friction (foundation brakes), the power equation remains valid. As previously stated, foundation brakes rely on a different cooling mechanism than retarders but are designed to act directly on the wheel end. Foundation brakes can provide consistent torque at all speeds and are also designed to deliver very-high torque (20,000 Nm for one wheel end) for emergency braking and are designed to accept the energy of a high-speed emergency brake stop from a fully-loaded commercial vehicle.

$$\text{Kenetic Energy (Joule)} = \frac{1}{2} * \text{Mass(kg)} * \left(\text{Velocity}\left(\frac{m}{s}\right)\right)^2$$

Consider once again the power equation to emphasize how much power can be accepted by a foundation brake.

$$\text{Power (Watts)} = \frac{\text{Energy (Joule)}}{\text{Time (second)}} = \text{Torque } (N \cdot m) * \text{Speed}\left(\frac{\text{rad}}{\text{s}}\right)$$

However, when the stop is complete, the brakes are very hot and need to be cooled. The cooling is primarily air convective cooling and is not as efficient as the forced cooling of the powertrain. Additionally, the electronic control of commercial vehicle brakes is highly refined after decades of ABS development resulting in smooth, comfortable braking at all speeds.

Automated driver assistance systems can be configured to maintain a following distance from a forward vehicle using a retarder at higher speeds, so the foundation brakes can be kept cool in the event strong foundation braking is needed. However, as the vehicle slows, the retarder torque realized at the road increases, and the gear shifts become more frequent. With each gear downshift, the disturbance to the driver becomes more noticeable. Similarly, as the vehicle speed slows, the energy put into the foundation brakes decreases with the square of velocity. Because of this and the highly-refined control of foundation brakes, it may be beneficial to transition from retarder braking to foundation braking at low speeds. Not only will that improve driver comfort, but it will also utilize the foundation brakes in such a way that the likelihood of overheating is low.

Figure 2:
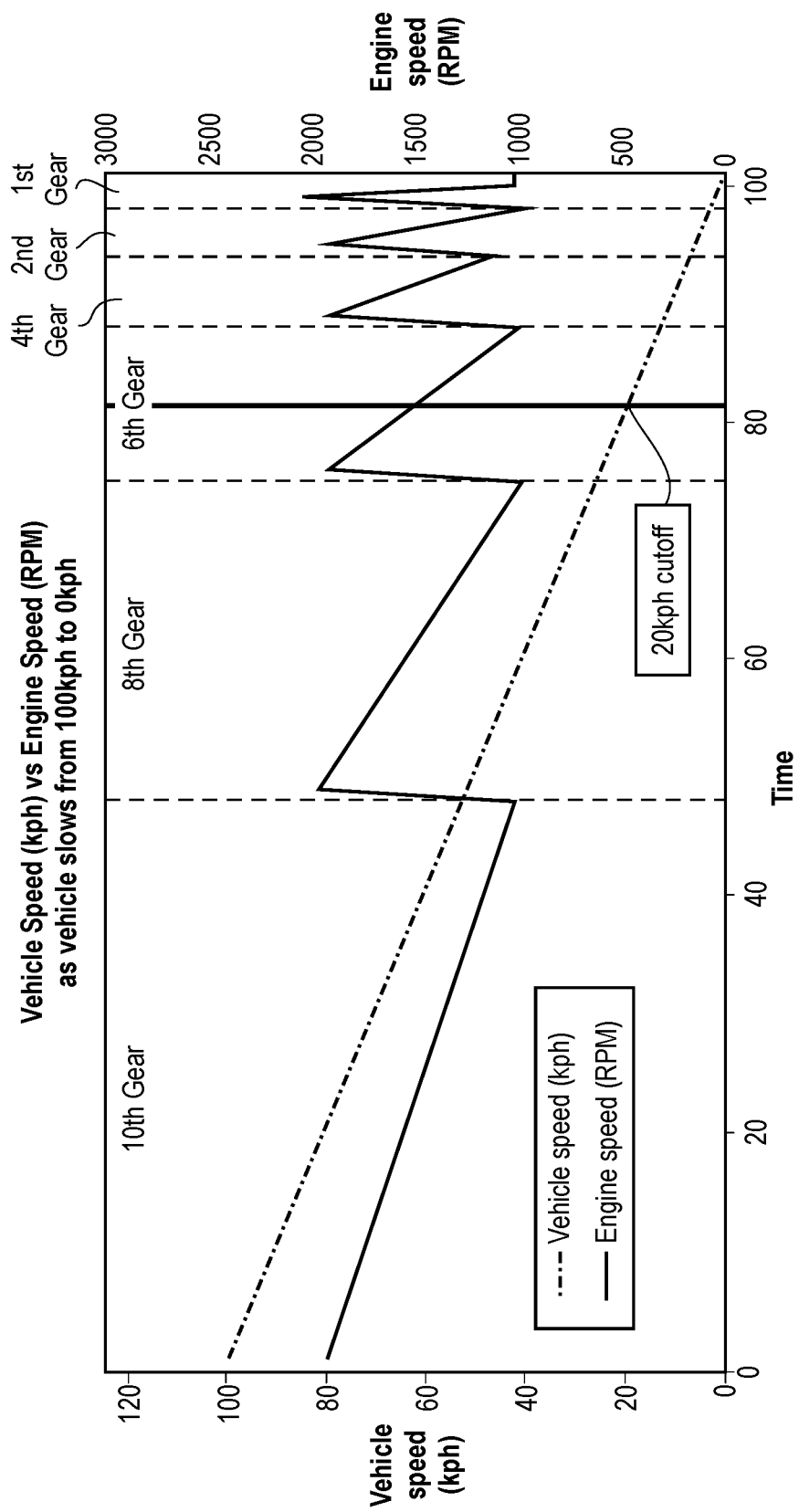
FIG. 2 is a graph of an embodiment of vehicle speed and engine speed over time as a vehicle slows.
Figure 3:
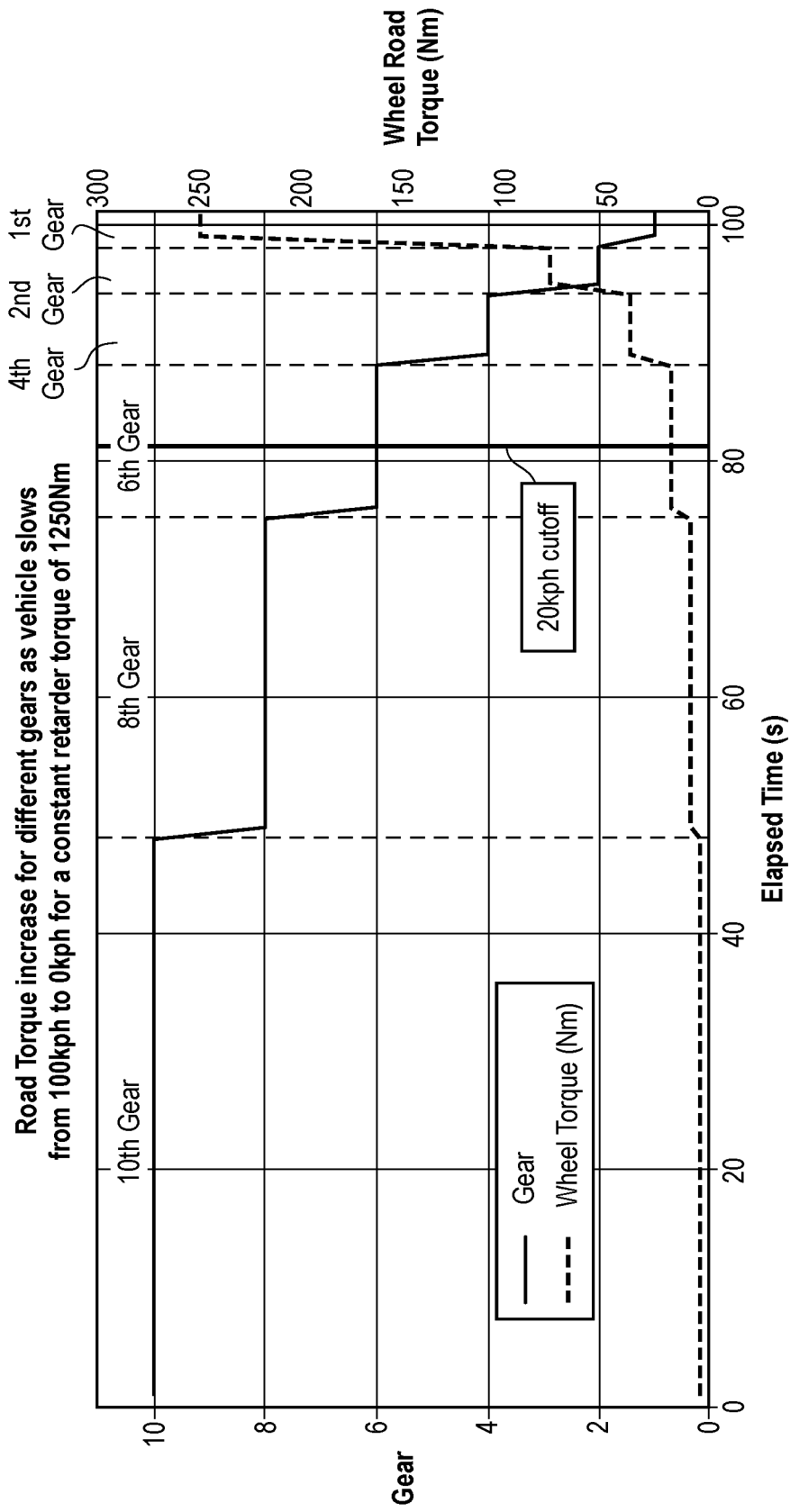
FIG. 3 is a graph of an embodiment of wheel road torque and gearshifts over time as a vehicle slows.

Turning again to the drawings, FIGS. 2 and 3 are graphs showing the relationship between vehicle speed, engine speed, transmission gear, and road torque for an engine retarder with a constant 1,250 Nm of torque. In the graph in FIG. 2, the vehicle decelerates from 100 kph to 0 kph with a constant deceleration. The engine speed is kept between 1,000 rpm and 2,000 rpm, and, in this example, the transmission is skipping gears as the vehicle slows. The graph in FIG. 3 represents the exact same stop but shows the gear shifts and how the road torque changes as the vehicle slows. In this example, 20 kph is arbitrarily determined as the threshold below which the next gear shift will disable the retarder. As can be seen in this graph, the engine will shift gears very rapidly, and the road torque will increase exponentially. It should be noted that this graph is simplified and that, in reality, the vehicle may slow more rapidly as more road torque is realized. This can magnify the time between gear shifts and the discomfort to the driver.

Also, while the focus at higher speeds is generally on an economical driving style with low brake wear, at lower speeds, the aspect of precision increasingly comes to the fore. It may be desired for the vehicle's automated distance control system to regulate the distance to a forward vehicle precisely and reproducibly until the vehicle comes to a standstill. Because a retarder may not provide that level of precision at slow speeds, the driver may use more-precise compressed air brakes in such a situation.

The following embodiments can be used to eliminate retarder control at low speeds for improved driver comfort to make the transition from retarder to service brakes as comfortable as possible for the vehicle's occupant(s) by "hiding" the jerk caused by the retarder by timing it along with a gear shift. An example method of this embodiment will now be discussed in conjunction with the graph in FIG. 4 and the flow chart 500 in FIG. 5. In this example, the engine retarder 200 is the primary retarder, and the transmission retarder 210 is the secondary retarder.

Figure 4:
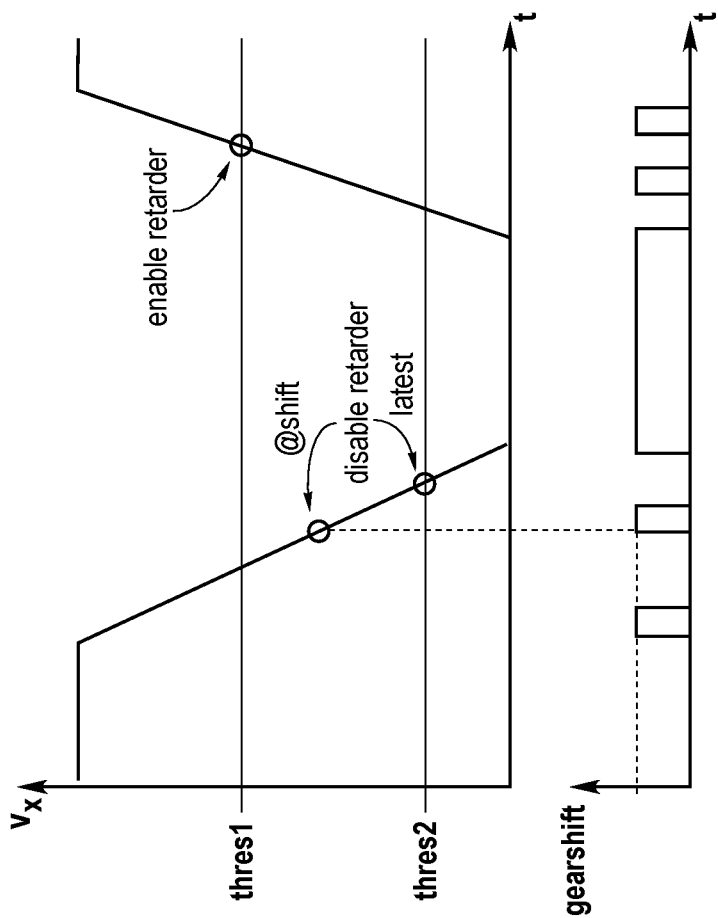
FIG. 4 is a graph of an embodiment of vehicle speed and gearshifts over time.

With reference first to FIG. 4, first and second speed thresholds ("thres1" and "thres2") are defined. Above the first speed threshold, it is desired to enable a retarder of the vehicle 100 to decelerate the vehicle 100 (e.g., upon a manual request from the driver and/or upon a control signal from the processor(s) 310). In contrast, it is desired to disable the retarder to prevent the retarder from being used to decelerate the vehicle 100 when the vehicle's speed is below the second speed threshold for the reasons set forth above. With the retarder being disabled, the vehicle's service brakes can be manually or automatically be applied to decelerate the vehicle 100.

Figure 5:
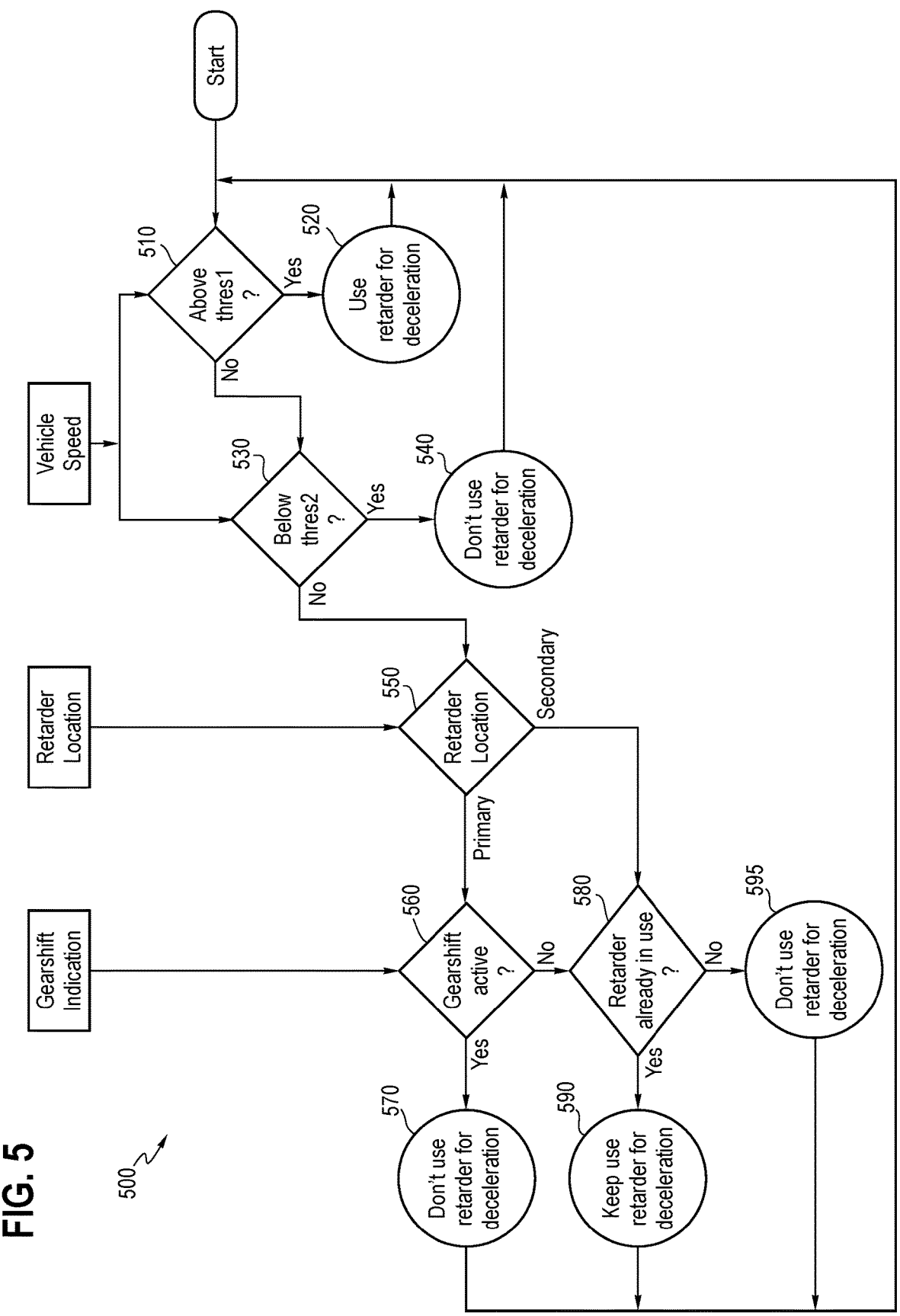
FIG. 5 is a flow chart of a method of an embodiment for disabling a retarder during a gearshift at low speeds for improved driver comfort.

Turning now to the flow chart 500 in FIG. 5, at the start of this method, the processor(s) 310 determine if the vehicle's speed is above the first threshold (act 510). The vehicle's speed can be determined, for example, using a wheel speed sensor or other device. If the vehicle's speed is above the first threshold, the processor(s) 310 allow the retarder of the vehicle 100 to be used for deceleration (act 520). However, if the vehicle's speed is not above the first threshold, the processor(s) 310 determine if the vehicle's speed is below the second threshold (act 530). If the vehicle's speed is below the second threshold, the processor(s) 310 disable the retarder, so it cannot be used to deceleration the vehicle (act 540). However, if the vehicle's speed is not below the second threshold, the processor(s) 310 determine if the retarder usually used is the primary retarder or the secondary retarder (act 550). If the retarder is the secondary retarder, the processor(s) 310 determine whether the retarder is already in use (act 580). If the retarder is already in use, the processor(s) 310 allow the retarder to continue to be used to decelerate the vehicle 100 (act 590). However, if the retarder is not already in use, the processor(s) 310 disable the retarder, so it cannot be used to decelerate the vehicle 100 (act 595).

Referring back to act 550, if the retarder is the primary retarder, the processor(s) 310 determine whether there is an active gearshift (act 560). If there is an active gearshift, the processor(s) 310 disable the retarder so it cannot be used to decelerate the vehicle 100 (act 570). As explained above, disabling the retarder during a gearshift can improved driver comfort by eliminate a future disruption to the driver if the retarder was disabled later. If there is no active gearshift, the processor(s) 310 determine whether the retarder is already in use (act 580). If the retarder is already in use, the processor(s) 310 allow the retarder to continue to be used to decelerate the vehicle 100 (act 590). However, if the retarder is not already in use, the processor(s) 310 disable the retarder, so it cannot be used to decelerate the vehicle 100 (act 595). Nevertheless, if the speed later drops below the second threshold without a shifting operation having taken place up to that point, the processor(s) 310 can automatically disable the retarder (see acts 530 and 540). That is, if the retarder is not disabled by the time the vehicle's speed drops below the second speed threshold (or after a time limit has been exceeded), the processor(s) 310 can automatically disable the retarder then. The retarder can be re-enabled for usage after the vehicle's speed exceeds the first threshold.

So, in this example, for a distance control system below a speed threshold value, the retarder can be disabled. With these embodiments, the transition from deceleration with a retarder above the speed threshold to deceleration without a retarder below the speed threshold can be made as comfortable as possible. This is because the retarder is not deactivated immediately after the first threshold value has been undershot. Instead, the next shifting process of the transmission is awaited. These embodiments recognize that power flow is interrupted during the next shifting process and use that opportunity to switch off the retarder, thereby eliminating an additional, uncomfortable jolt to the driver. As an example use case of this embodiment, consider the situation where a truck drives on a country road with a relatively-high speed and a forward vehicle brakes to a standstill. The distance control system of the truck can initially react by activating the primary retarder and, if necessary, the compressed air brake (friction). After the speed falls below the threshold value, the actuation of the primary retarder is stopped during the next gear change, and the vehicle is decelerated to a standstill only with the compressed air brake.

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein. Additionally, "in response to" can be directly in response to or indirectly in response to. Also, the term "or" as used herein is to be interpreted as inclusive or meaning any one or any combination. Therefore, "A, B or C" means "any of the following: A; B; C; A and B; A and C; B and C; A, B and C".

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A non-transitory computer-readable storage medium storing computer-readable instructions that, when executed by one or more processors in a vehicle comprising a retarder, cause the one or more processors to:
    determine whether a speed of the vehicle is below a first threshold but above a second threshold; and
    in response to determining that the speed of the vehicle is below the first threshold but above the second threshold:

disable the retarder during a gear shift if the retarder is enabled; or prevent enabling the retarder if the retarder is not enabled.

2. The non-transitory computer-readable storage medium of claim 1, wherein the instructions, when executed, further cause the one or more processors to:

determine whether the retarder is a primary retarder or a secondary retarder; and determine whether a gearshift is active.

3. The non-transitory computer-readable storage medium of claim 2, wherein the primary retarder comprises an engine retarder or an exhaust retarder.

4. The non-transitory computer-readable storage medium of claim 3, secondary retarder comprises a transmission retarder or a driveline retarder.

5. The non-transitory computer-readable storage medium of claim 1, wherein the instructions, when executed, further cause the one or more processors to:

determine whether the speed of the vehicle is above the first threshold; and in response to determining that the speed of the vehicle is above the first threshold, use the retarder to decelerate the vehicle.

6. The non-transitory computer-readable storage medium of claim 1, wherein the instructions, when executed, further cause the one or more processors to:

determine whether the speed of the vehicle is below the second threshold; and in response to determining that the speed of the vehicle is below the second threshold, disable the retarder or prevent enabling of the retarder irrespective of a gear shift or a location of the retarder.

7. The non-transitory computer-readable storage medium of claim 6, wherein the instructions, when executed, further cause the one or more processors to:

determine whether the speed of the vehicle is above the second threshold; and in response to determining that the speed of the vehicle is above the second threshold, re-use of the retarder.

8. The non-transitory computer-readable storage medium of claim 1, wherein the instructions, when executed, further cause the one or more processors to:

determine whether a period of time has elapsed since the speed of the vehicle fell below the first threshold; and in response to determining that the period of time has elapsed, disable the retarder or prevent use of the retarder irrespective of a gear shift or a location of the retarder.

9. The non-transitory computer-readable storage medium of claim 1, wherein the instructions, when executed, further cause the one or more processors to:

cause service brakes of the vehicle to be applied to decelerate the vehicle in response to the retarder being disabled.

10. The non-transitory computer-readable storage medium of claim 1, wherein the retarder comprises an engine retarder or an exhaust retarder.

11. A method comprising:

performing in a vehicle comprising an engine and a retarder configured to decelerate the vehicle:

determining that the retarder is to be disabled; and delaying disabling the retarder until a gear shift occurs.

12. The method of claim 11, wherein the retarder is to be disabled in response to the vehicle decelerating to a predetermined speed.

13. The method of claim 11, further comprising:

in response to the gear shift not occurring prior to the vehicle decelerating to a predetermined speed, disabling the retarder even though the gear shift has not occurred.

14. The method of claim 11, further comprising:

in response to the gear shift not occurring after a period of time after determining that the retarder is to be disabled, disabling the retarder even though the gear shift has not occurred.

15. The method of claim 11, further comprising:

disabling the retarder;

after disabling the retarder, determining that the vehicle has accelerated to a predetermined speed; and in response to determining that the vehicle has accelerated to the predetermined speed, re-enabling the retarder.

16. The method of claim 11, further comprising:

causing service brakes of the vehicle to be applied to decelerate the vehicle in response to the retarder being disabled.

17. The method of claim 11, wherein the retarder comprises an engine retarder or an exhaust retarder.

18. A vehicle comprising:

an engine;

a transmission;

a retarder; and means for:

determining whether a speed of the vehicle is below a first threshold but above a second threshold; and in response to determining that the speed of the vehicle is below the first threshold but above the second threshold:

disabling the retarder during a gear shift of the transmission if the retarder is enabled; or preventing enabling the retarder if the retarder is not enabled.

19. The vehicle of claim 18, further comprising:

means for:

determining whether the speed of the vehicle is above the first threshold; and in response to determining that the speed of the vehicle is above the first threshold, using the retarder to decelerate the vehicle.

20. The vehicle of claim 18, further comprising:

means for:

determining whether the speed of the vehicle is below the second threshold; and in response to determining that the speed of the vehicle is below the second threshold, disabling the retarder or prevent enabling of the retarder irrespective of a gear shift or a location of the retarder.

* * * * *